G. H. KENDALL.
MOWING MACHINE.
APPLICATION FILED MAR. 19, 1910. RENEWED JAN. 27, 1916.
1,193,557.
Patented Aug. 8, 1916.
3 SHEETS—SHEET 2.
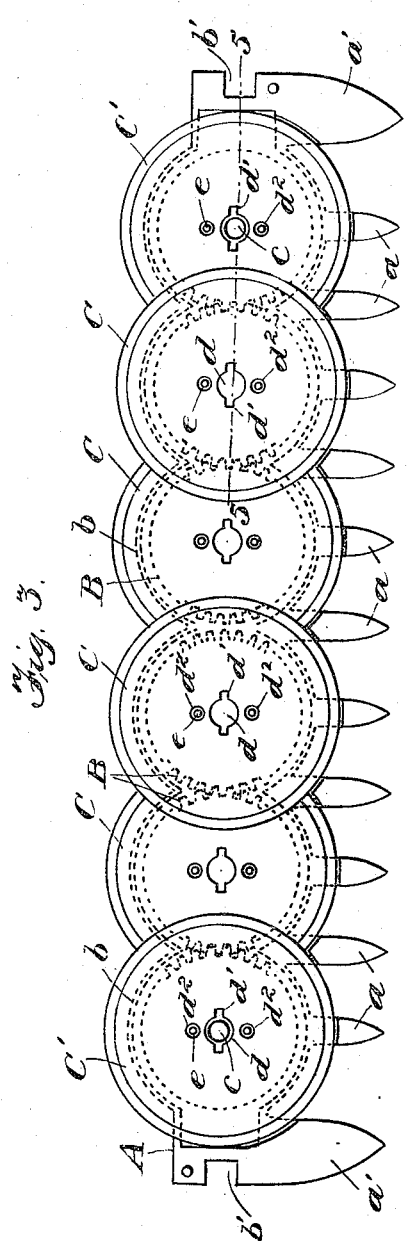
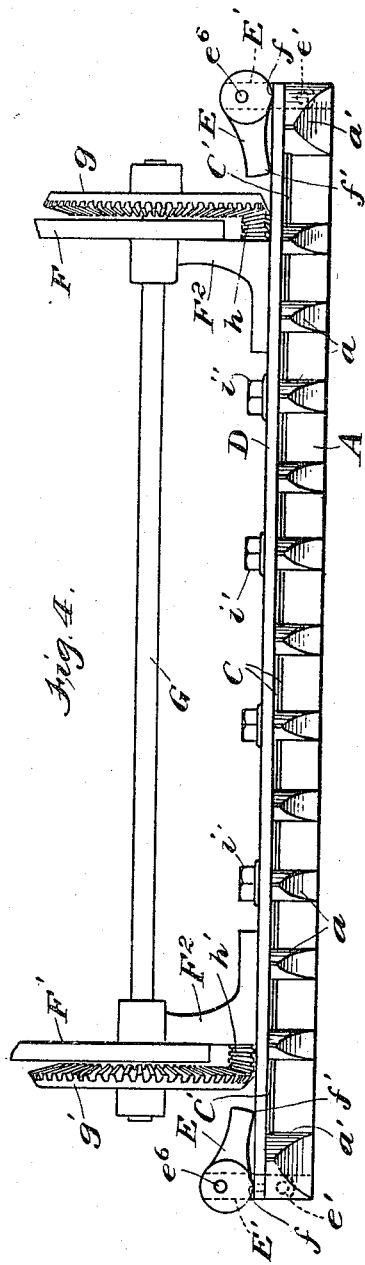
Witnesses:
Robert Head
M. E. Freeman
Inventor:
George H. Kendal
By his Attorney G. H. KENDALL.
MOWING MACHINE.
APPLICATION FILED MAR. 19, 1910. RENEWED JAN. 27, 1916.
1,193,557.
Patented Aug. 8, 1916.
3 SHEETS—SHEET 3.
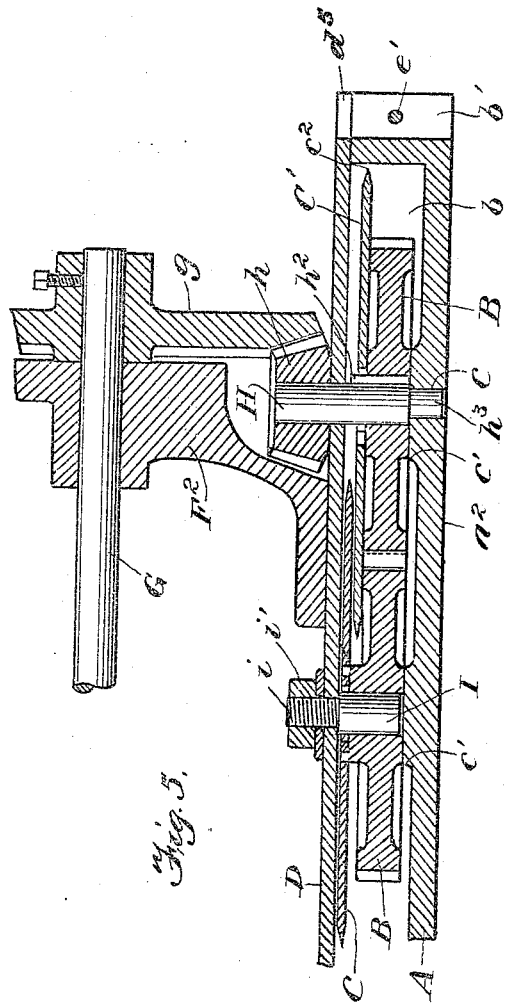
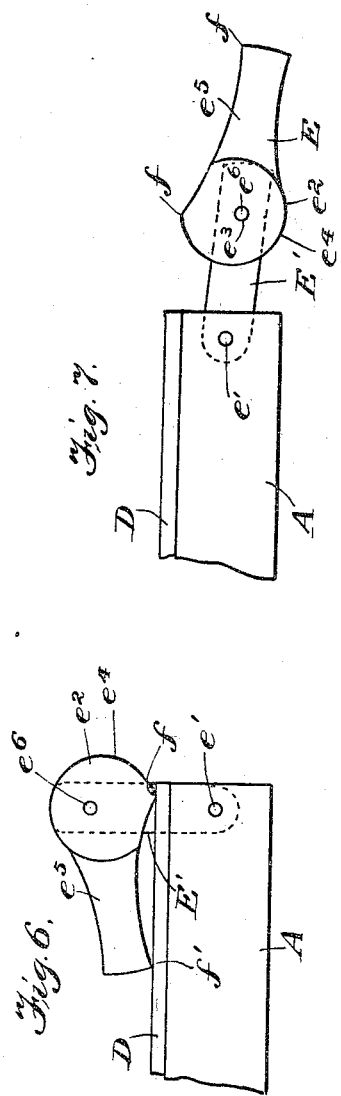
Witnesses:
Robert Head
M. E. Freeman
Inventor:
George H. Kendall
By his Attorney

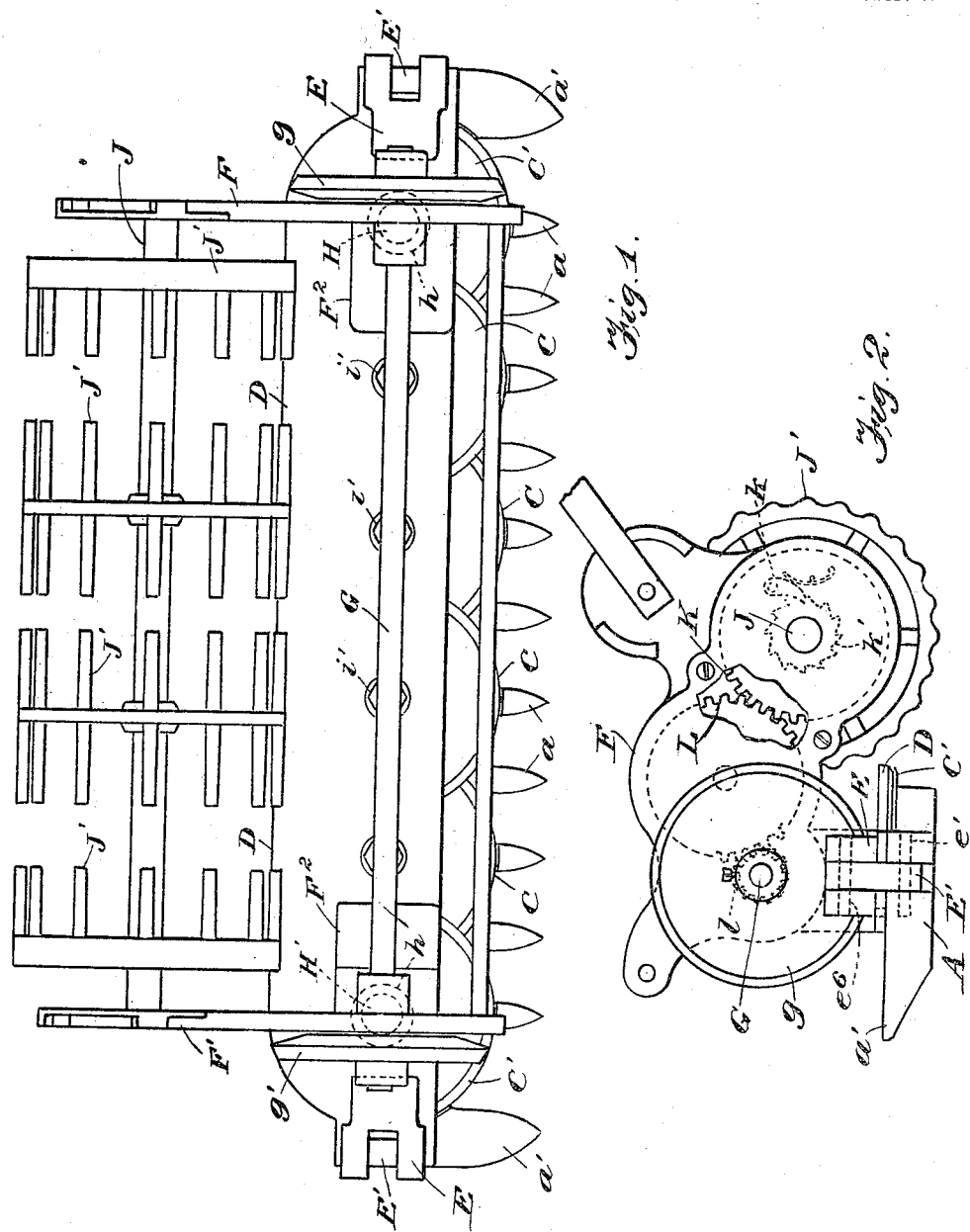

UNITED STATES PATENT OFFICE.

GEORGE H. KENDALL, OF NEW YORK, N. Y.

MOWING-MACHINE.

1,193,557.  Specification of Letters Patent.  Patented Aug. 8, 1916.

Application filed March 19, 1910, Serial No. 550,354. Renewed January 27, 1916. Serial No. 74,700.

*To all whom it may concern:*

Be it known that I, GEORGE H. KENDALL, a citizen of the United States, residing in the city of New York, borough of Manhattan, county and State of New York, have invented a certain new and useful Mowing-Machine, of which the following is a specification.

This invention is a mowing machine, the principal feature of novelty of which resides in cutting mechanism embodying a rotatable knife, or a plurality of rotatable knives, having substantially continuous cutting edges.

As is well known, commercial mowing machines embody reciprocating cutting mechanism operated, ordinarily, by a crank and a pitman driven from a traction wheel. The operation of such machines results in a large amount of friction, and consequent wear, on the working parts, and, besides, the worn parts cannot be repaired and replaced expeditiously. Moreover, the reciprocation of a cutter involves such a throw or movement of unbalanced heavy or weighted parts as to require the expenditure of a large amount of power for the operation of such reciprocating mechanism as compared with a rotary cutter, and, furthermore, there is necessarily a very considerable lost motion in the operation of a crank driven reciprocating cutter.

This invention overcomes the foregoing and other objections and disadvantages inherent in prior cutting mechanisms, and results in a machine which is simple in construction, yet economical and effective in operation.

Among other advantages, my machine secures a great saving in power; the weight and size of the parts, the throw of metal in the constituent parts, and the ease and freedom with which the parts run, render the machine capable of operation by a man, thus making the machine useful, more particularly in localities where horse power is not available; in comparison with ordinary horse power mowers, which are so heavy as to require several men to lift them, and are so large as to take up the space of a wagon, my machine is so reduced in weight and so compact in construction that it can readily be lifted and carried by hand; the machine is so constructed that the cutting mechanism may be inspected, repaired and re-assembled by unskilled labor; the cost of new knives is diminished; the knives can be taken out and replaced by others inside of a minute's time; the construction is exceedingly simple and the knives and their operating gears are interchangeable; and the weight of metal of the parts, and their construction and assemblage, are such that the machine can be manufactured at a great saving in cost as compared with prior commercial mowers.

The invention embodies a novel cutting mechanism which includes, among other elements, a plurality of rotatable knives, each having a substantially continuous cutting edge. In operation, there is a substantial part of the cutting edge on each of the rotatable knives presented constantly to the standing grass or grain, whereby the continuous and rotating cutting edges act with great efficiency in cutting the standing grain.

The invention embodies, also, a novel pivoted locking device, or a plurality of such devices, whereby the finger bar of the cutting mechanism is retained in coöperative relation to a bar of the machine frame, and is rigidly held against the possibility of accidental separation, while at the same time the locking device or devices are capable of easy and rapid operation for the purpose of separating said finger bar from the machine frame, to the end that access may be had to the cutting mechanism.

In contradistinction to the ordinary eccentric clamp adapted for binding frictional engagement with a part to be locked, my locking member is constructed in a way to secure two points of bearing or contact with a bar of the machine frame; but the distinctive feature of the locking device is the location of the pivot in a plane between the two points of bearing or contact when the pivoted device is in a locking position, so that the draft or weight of the finger bar and the cutting devices act to retain each movable locking member so firmly in locking position that said member cannot become displaced accidentally. Furthermore, the wear on the pivoted locking member does not, and cannot, have any effect whatsoever upon the effectiveness of the device. Again, the device is so constructed that the greater the draft or weight imposed thereon the more firmly is it retained in the locking position.

Various other features of the invention will hereinafter appear in the annexed description taken in connection with the drawings.

In the accompanying drawings I have illustrated one practical embodiment of the invention, but the construction shown therein is to be understood as illustrative, only, and not as defining the limits of the invention.

Figure 1 is a plan view of one type of mowing machine provided with a cutting apparatus of this invention. Fig. 2 is an elevation looking at the right hand end of the machine shown in Fig. 1. Fig. 3 is a plan view illustrating the cutting mechanism disconnected from the machine proper. Fig. 4 is a view in front elevation of the cutting mechanism. Fig. 5 is a vertical longitudinal section on the line 5—5 of Fig. 3 on an enlarged scale. Figs. 6 and 7 illustrate the locking and released positions of a locking device by which the finger bar of the cutting mechanism is connected detachably to the machine frame.

A designates a finger bar which is provided on its front edge with a row of fingers, $a$, and at its ends with guard fingers, $a'$. Said finger bar is provided, also, with a series of pockets, $b$, indicated in dotted lines in Fig. 3, and, as shown, said finger bar is provided at its ends with notches, $b'$. The bottom plate, $a^2$, of the finger bar is provided near its ends with openings, $c$, and with bosses or shoulders, $c'$, the purpose of which will presently appear.

Within pockets, $b$, of the finger bar are positioned gear wheels, B, shown in full lines in Fig. 5 and in dotted lines in Fig. 3. Each gear wheel is provided with a central opening and with one or more key slots, the hub of the gear engaging with one shoulder or boss, $c'$, on the bottom plate of the finger bar.

Coöperating with gears, B, are rotatable knives, C, C', the knives, C', being near the ends of the finger bar. As shown each knife is a circular plate having its edges beveled to produce a cutting edge, $c^2$, but, obviously, the shape of the cutting knives may be modified as desired; for example, I may use a substantially triangular knife, or a quadrangular knife, or a hexagonal or octagonal knife, or a knife of any other desired shape, but in each form the knife is provided with a substantially continuous cutting edge, such as the edge, $c^2$, of the circular knife shown in Figs. 3 and 5. Each knife of the series rests upon one of the gears, B, and said knife is operatively connected with said gear by means which secure an interlocking connection between the knife and the gear. Said connection may be of any desired construction, but, as shown in Fig. 3, each knife is provided with a central opening, $d$, with one or two notches, $d'$, and apertures, $d^2$, at the respective sides of the central opening, $d$. The gear upon which the knife rests is provided with upwardly extending pins, $e$, which are adapted to enter openings, $d^2$, of the knife, whereby the pins are adapted to lock the knife to the gear, and to permit the knife to be readily lifted off the gear when the finger bar is disconnected from the machine frame, as will be presently described. As shown in Figs. 3 and 5, the knives are in two series, three of the knives being below three other knives, and adjacent knives overlapping each other, whereby each two adjacent knives are adapted for rotation in opposite directions. This arrangement of knives and gears, however, may be modified as desired, and instead of disposing gears, B, into intermeshing engagement with each other, I may employ intermediate gears for the purpose of rotating the knives in one direction. This is an optional arrangement and provision for rotating the knives in one direction may easily be made by a skilled constructor.

D is a frame bar positioned directly over cutter bar, A, and adapted to be connected therewith by locking devices constructed as shown in Figs. 6 and 7. Each locking device consists of a member, E, and a link, E', the latter being fitted in a notch, $b'$, of the finger bar, whereby the link is adapted to be pivoted by a pin, $e'$, to the finger bar. The member, E, is, preferably, cast in a single piece, and it comprises a body portion, $e^2$, having an opening, $e^3$, and a curved edge, $e^4$, said body portion being provided with a handle, $e^5$. The edge, $e^4$, of the locking member is eccentric to opening, $e^3$, and said curved edge terminates in a bearing point, $f$, the edge, $f'$, of the handle, $e^5$, being the other bearing point. The link, E', is connected pivotally by a pin, $e^6$, to the member, E, and said link is adapted to be turned to the vertical position of Fig. 6, or to the substantially horizontal position of Fig. 7. Frame bar, D, is provided at its ends with notches the position of which notches is indicated at $d^5$ in Fig. 5, said notches of the frame bar being adapted to register with notches, $b'$, of the finger bar when the cutting mechanism is assembled into coöperative relation to the machine frame, and by turning the locking devices to the position of Fig. 6, links, E', of said locking devices are adapted to enter the notches of frame bar, D, after which the pivoted members, E, may be turned inwardly on pins, $e^6$. This inward movement of each locking member, E, brings its bearing or contact points, $f$, $f'$, into engagement with the frame bar, D, and said locking members operate to firmly attach the finger bar and its contained devices to bar, D, of the machine frame. The pivot, $e^6$, of the locking device is so related to the contact points, $f$, $f'$, that when member, E, is adjusted to the operative position shown in Figs. 2 and 6 pivot pin, $e^6$, will be in a plane between the points of contact, $f$, $f'$, of member, E, with frame bar, D. This secures the important advantage of locking the member, E, in its operative position for the reason that the draft or weight of the cutting mechanism will be exerted upon pivot, $e^6$, at a point between the bearing or contact points, $f$, $f'$, of the locking member, whereby the greater the draft or weight of the cutting apparatus, the greater will be the strain imposed upon the pivoted member, E. The pivoted member of my locking device does not act to retain the finger bar in position like an ordinary clamping eccentric wherein the eccentric edge acts frictionally to bind upon one of the two parts which are to be locked together. The eccentric edge of my locking member does not frictionally bind upon frame bar, D, but on the contrary, the locking member engages with said frame bar at two points only when in its locking position, and the pivot of the locking member is in a plane between said two points of contact. The result of this arrangement is that the locking members are retained in their operative positions, but at the same time, the pivoted members, E, may easily be turned by hand so as to remove said members from engagement with bar, D, after which the links, E', may be swung outwardly, thus releasing the finger bar from the machine frame.

Frame bar, D, is connected or attached in any usual way to the side frames, F, F', of the mowing machine frame, and it is provided with brackets, $F^2$, which afford bearings for a cutter driving shaft, G, the latter occupying a horizontal position over the cutting mechanism. At its ends said shaft, G, is provided with bevel gears, $g$, $g'$, which mesh with bevel pinions, $h$, $h'$, on short vertical shafts, H, H', respectively. Said short vertical shafts are journaled in suitable openings provided in frame bar, D, and each shaft is provided with a key, $h^2$, and with a reduced lower end, $h^3$. The shafts, H, H', are adapted to be rotated simultaneously by the gearing which connects said shafts, H, H', with shaft, G. The shafts, H, H', are mounted in the frame plate, D, so as to remain attached thereto when the finger bar, the gears and the cutters are disconnected from the machine frame. The frame bar, D, is provided, also, with axles, I, each having a threaded end portion, $i$, on which is screwed a nut $i'$, for the purpose of securely attaching the axles to the frame bar.

When it is desired to disconnect the cutting mechanism from the machine frame, the operator moves locking members, E, on the pivots, $e^6$, and thereafter turns links, E', outwardly to the position of Fig. 7. The frame bar, D, may now be lifted away from finger bar, A, and this operation withdraws shafts, H, H', from gears, B, and circular knives, C', and at the same time, withdraws axles, I, from the other gears, B, and circular knives, C. The finger bar with the gears and knives are thus readily disconnected from the machine frame so that the finger bar will expose the knives, C, C', to ready access, as shown in Fig. 3, thus enabling the operator to remove any one or more of the knives, after which other knives may be easily and quickly placed in position. To reassemble the cutting mechanism with relation to the machine, frame bar, D, is placed in position over the finger bar so that the shafts, H, H', will pass through knives, C', and two gears, whereas axles, I, will pass through knives, C, and the remaining gears. The operator now swings the links, E', inwardly and turns the locking members, E, in a downward direction so as to bring the bearing points, $f$, $f'$, into contact with the frame bar. When shafts, H, H', are inserted into the gears, E, and knives, C', the keys, $h^2$, of said shaft will enter the key slots of gears, B, and knives, C', whereby the two end gears and the two end knives will be made fast with said shafts, H, H'. Three of the gears at one side of the middle of the machine mesh directly together, whereas the other three gears mesh directly with each other, but the two middle gears are spaced or separated so that they will not mesh one with the other, all as shown in dotted lines in Fig. 3. This organization enables each shaft, H or H', to drive three of said gears, and their corresponding cutters, but by disconnecting the two middle gears, the machine may be turned in one direction or the other at the end of a swath without locking the gears against rotation when turning the machine.

The machine frame is shown as having a shaft, J, provided with traction wheels, J'. On the shaft, J, is loosely mounted a gear wheel, K, provided with a pawl, $k$, adapted to engage a ratchet, $k'$, the ratchet and pawl constituting one form of clutch mechanism by which the traction wheel is adapted to impart motion to the gear wheel. Said gear wheel, K, meshes with an intermediate gear, L, supported on one of the frame plates, as shown in dotted lines in Fig. 2, and this intermediate gear meshes with a gear pinion, $l$, which is secured rigidly to cutter driving shaft, G. When the machine is moved in a forward direction, the traction wheels rotate shaft, J, and this shaft in turn drives the gears, K, L, $l$, for the purpose of turning shaft, G. The latter shaft operates, $g$, $g'$, which in turn drive pinions, $h$, $h'$, for rotating shafts, H, H', and these last mentioned shafts operate the two sets of gears, B, for imparting rotary motion to knives, C, C'.

My machine may be equipped with a suitable handle for the purpose of propelling said machine by man power, but, obviously, the mower may be equipped with a horse power draft appliance, or any suitable means may be provided for the operation of the machine.

The operation of the cutting mechanism will be apparent from the foregoing description. When the machine is propelled, usually by hand, the shaft, G, is rotated from the traction wheel shaft, and shafts, H, H', are operated for driving gears, B, and circular knives, C, C'. The knives are so positioned to the finger bar that each knife presents a substantial portion of its cutting edge constantly to the standing grain, whereby as the machine is moved the cutters act to cut the stalks easily and cleanly. The circular knives are rotated at a speed exceeding the speed of movement of the machine across the field, and as said knives are provided with sharp cutting edges, they act efficiently in cutting the stalks.

Of course, any desired number of rotating disks may be used. I have shown six circular disks, but the number and shape of the disks or knives may be modified. The gears and knives herein illustrated as the preferred construction are interchangeable so that skill is not required for changing the knives in order to replace a dull knife by a sharp one. Each knife is manufactured cheaply, by stamping a blank from a piece of metal and grinding it to a cutting edge, whereby dull knives may be thrown away and sharpened knives substituted therefor.

It is evident that the cutting mechanism may be detached easily and quickly, thus exposing the knives to access. To replace the dull knives, it is only necessary to lift them off the gears and the pins, and to drop fresh knives into position, after which the finger bar is placed in position beneath the frame bar, D, so that axles, I, and shafts, H, H', will pass through the knives and the gears, the reduced ends, $h^3$, of shafts, H, H', entering holes, $c$, in the finger bar, and then the locking devices, E, are re-adjusted to firmly lock the finger bar to the machine frame. The links, E', and locking devices preclude any movement of the finger bar relative to the machine frame when the locking devices are adjusted to lock the finger bar, for the reason that the links enter notches in the finger bar and the frame bar.

Having thus fully described the invention, what I claim as new, and desire to secure by Letters Patent is:

1. In a cutting apparatus, the combination of a finger bar, a plurality of series of gears mounted thereon, the gears of each series meshing with one another and the adjacent gears of the different series being disconnected, a plurality of series of rotatable knives equal in number to the number of series of gears and each knife being operable by one gear, a common source of power for operating the gears, and separate means communicating with said source of power and with each series of gears, whereby each of said series is driven independently of its adjacent series.

2. In a cutting apparatus, the combination of a finger bar, a plurality of series of gears mounted thereon, each of said series of gears being in train and each train being disconnected from its adjacent train, a power shaft, traction wheels adapted to generate the power for driving said power shaft, separate means communicating with said power shaft and each of said gear trains, whereby each of said trains is driven independently from the power shaft, and a cutter disk coöperating with each gear and rotatable thereby.

3. In a cutting apparatus, the combination of a frame bar, a finger bar positioned below said frame bar, locking means coöperating with said bars for detachably securing them together, gears and rotary cutters positioned intermediate the frame and finger bars and supported by the latter, means coöperating with the frame bar for properly positioning said gears and cutters, said positioning means being unattached to the finger bar, whereby, upon the releasing of said locking means, the frame bar and coöperating positioning means may be simultaneously removed from the finger bar, leaving said finger bar and the gears and cutters which it supports as a detached unit.

4. In a cutting apparatus, the combination of a frame bar, a finger bar positioned below the frame bar, cutting mechanism mounted upon the finger bar and retained in relative position by positioning means mounted on the frame bar, and locking means mounted on one of said bars and coöperating with the other bar for the purpose of locking the bars against relative movement, said locking means being operable to disengage the bars whereby the frame bar with its positioning devices is simultaneously removable from the finger bar and the gears and cutters which depend upon said finger bar for support.

5. In a cutting apparatus, the combination of a frame bar, a finger bar positioned below said frame bar, means for detachably locking said bars against relative movement, gears and cutters positioned intermediate the frame and finger bars and supported by the latter, spindles for said gears and cutters, said spindles being secured to the frame bar and unattached with respect to the finger bar, whereby, upon the releasing of the locking means, the frame bar and spindles may be simultaneously removed from the finger bar, leaving as a detached unit the finger bar and the gears and cutters which it supports.

6. In a mowing machine, the combination of a frame bar forming a permanent part of the mower frame, a finger bar positioned below said frame bar, gears and rotary cutters supported by said finger bar, positioning members mounted on the frame bar and coöperating with the gears and cutters for retaining them in relative position, and means for detachably connecting said finger bar to the frame bar, said connecting means being independent of the positioning members, and the finger bar with the gears and cutters thereon being removable as a unit at will from the frame bar and the positioning members.

7. In a cutting apparatus, the combination of a frame bar, a finger bar, cutting mechanism positioned between said bars and supported by the latter, a link pivoted to one of the bars, and an eccentric locking member pivoted to the free end of said link, said link being adapted to be swung upon its point of pivoting to bring the locking member into coöperative relation with the other bar and the eccentric locking member then swung on its point of pivoting on the link into engagement with said other bar, whereby the locking member, because of its eccentric form, precludes the weight of the finger bar and the jarring of the machine from working the locking member loose.

In testimony whereof I have signed my name to this specification in the presence of two subscribing witnesses.

GEORGE H. KENDALL.

Witnesses:
JAS. H. GRIFFIN,
H. T. BERNHARD.

Copies of this patent may be obtained for five cents each, by addressing the "Commissioner of Patents, Washington, D. C."